US 8,657,357 B2

(12) United States Patent
Dexter et al.

(10) Patent No.: US 8,657,357 B2
(45) Date of Patent: Feb. 25, 2014

(54) VISOR SYSTEM FOR OPEN-ROOF VEHICLES

(75) Inventors: Brian R. Dexter, Grand Haven, MI (US); Jonathan P. Marcus, Holland, MI (US)

(73) Assignee: Marcus Automotive, LLC, Holland, MI (US)

( * ) Notice: Subject to any disclaimer, the term of this patent is extended or adjusted under 35 U.S.C. 154(b) by 0 days.

(21) Appl. No.: 13/535,519

(22) Filed: Jun. 28, 2012

(65) Prior Publication Data

US 2013/0001976 A1    Jan. 3, 2013

Related U.S. Application Data

(60) Provisional application No. 61/503,381, filed on Jun. 30, 2011.

(51) Int. Cl.
*B60J 3/02* (2006.01)

(52) U.S. Cl.
USPC .......................................... 296/97.2; 296/97.9

(58) Field of Classification Search
USPC .......... 296/97.2, 97.6, 97.8, 97.9, 97.12, 97.1
IPC .......................................................... B60J 3/02
See application file for complete search history.

(56) References Cited

U.S. PATENT DOCUMENTS

| | | | | | |
|---|---|---|---|---|---|
| D57,653 | S | * | 4/1921 | Holsberg | D12/191 |
| 2,034,849 | A | * | 3/1936 | Westrope | 296/97.1 |
| 3,751,106 | A | * | 8/1973 | Mahler et al. | 296/97.1 |
| 4,895,435 | A | * | 1/1990 | Shomper | 359/844 |
| 4,989,910 | A | * | 2/1991 | Mersman et al. | 296/97.4 |
| 5,004,289 | A | * | 4/1991 | Lanser et al. | 296/97.12 |
| 5,080,420 | A | * | 1/1992 | Hemmeke et al. | 296/97.1 |
| D325,719 | S | * | 4/1992 | Langlais | D12/191 |
| 5,195,668 | A | * | 3/1993 | Kunes et al. | 224/312 |
| 5,219,199 | A | * | 6/1993 | Smith et al. | 296/97.8 |
| 5,344,206 | A | * | 9/1994 | Middleton | 296/97.8 |
| 5,365,416 | A | * | 11/1994 | Peterson | 362/135 |
| 5,390,973 | A | * | 2/1995 | Melotti | 296/97.5 |
| 5,564,772 | A | * | 10/1996 | Miller | 296/97.12 |
| 5,575,523 | A | * | 11/1996 | Keller | 296/97.7 |
| 5,685,629 | A | * | 11/1997 | Hemmeke et al. | 362/140 |
| 5,720,509 | A | * | 2/1998 | Binish | 296/97.5 |
| 5,727,837 | A | * | 3/1998 | Viertel | 296/97.1 |
| 6,409,246 | B1 | * | 6/2002 | Rennie | 296/97.6 |
| 6,527,329 | B2 | * | 3/2003 | Bauer et al. | 296/97.4 |
| 6,698,815 | B1 | * | 3/2004 | Mills et al. | 296/97.2 |
| 6,705,661 | B2 | * | 3/2004 | Amirmoini | 296/97.6 |
| 6,811,201 | B2 | * | 11/2004 | Naik | 296/97.2 |
| 6,890,017 | B2 | * | 5/2005 | Herbst et al. | 296/97.1 |
| 6,899,371 | B1 | * | 5/2005 | Hammond | 296/97.6 |
| 6,979,042 | B2 | * | 12/2005 | Kawasaki | 296/97.8 |

(Continued)

*Primary Examiner* — Glenn Dayoan
*Assistant Examiner* — Pinel Romain
(74) *Attorney, Agent, or Firm* — Price Heneveld LLP

(57) ABSTRACT

A visor has a curvilinear section which is pivotally mounted to the header rail of a vehicle and, when in a stored position, conforms closely to the geometry of the header rail. It is mounted to allow the visor to pivot away from the windshield toward the driver or passenger, lowering the visor to provide sun-blocking protection. It can be rotated further until it extends through the open area of the roof, when the roof is removed, to provide sun-blocking above the header rail. The curvilinear visor body may also include a glare shield which can be extended from the lower edge of the visor to provide additional sun-blocking protection.

19 Claims, 6 Drawing Sheets

(56) References Cited

U.S. PATENT DOCUMENTS

| | | | |
|---|---|---|---|
| 7,124,541 B2* | 10/2006 | Fellner | 49/502 |
| 7,918,491 B2* | 4/2011 | Olep et al. | 296/97.8 |
| 8,191,602 B1* | 6/2012 | Motosko | 160/180 |
| 2003/0071478 A1* | 4/2003 | Wells | 296/97.2 |
| 2004/0056504 A1* | 3/2004 | Hattass et al. | 296/97.1 |
| 2005/0230998 A1* | 10/2005 | Im | 296/97.6 |
| 2009/0218845 A1* | 9/2009 | Rockafellow | 296/97.5 |

* cited by examiner

US 8,657,357 B2

VISOR SYSTEM FOR OPEN-ROOF VEHICLES

CROSS-REFERENCE TO RELATED APPLICATIONS

This application claims priority under 35 U.S.C. §119(e) and the benefit of U.S. Provisional Application No. 61/503,381 entitled VISOR SYSTEM FOR CONVERTIBLES, filed on Jun. 30, 2011, by Brian R. Dexter, et al., the entire disclosure of which is incorporated herein by reference.

BACKGROUND OF THE INVENTION

The present invention relates to visors and particularly a visor which can be mounted to the header rail of an open-roof vehicle.

A recent trend in sport vehicles, such as the Jeep® Wrangler® JK, is to provide removable tops to provide an open, convertible-like feel for the occupants. To date, such vehicles have employed conventional visors mounted to the header rail extending between the A-pillars of the vehicle. Such vehicles do not have conventional headliners with pockets allowing conventional visors to nest therein. As a result, conventional visors, when mounted to such a vehicle, appear somewhat ungainly and need to be moved when the top is being installed or removed since the roof latching mechanism must clear the visor area.

SUMMARY OF THE INVENTION

The present invention improves upon existing visors employed in vehicles with detachable roofs by integrating a curved panel visor which attaches to a header rail of the vehicle in a manner in which the visor panel follows the curve of the windshield header rail, providing a smooth clean appearance for the visor installation. The visor is hinged at the top and can be lowered from a stowed position in a direction rearwardly away from the windshield to a use position. It is capable of further movement upwardly above the roof line for deflecting sunlight when entering at a higher angle, thereby providing sun-blocking protection both above and below the header rail.

In a preferred embodiment of the invention, the visor may include a secondary glare shield which rotates from a nested position coplanar with the visor panel to an extended position to provide additional sun-blocking protection for the visor. In some embodiments, additional features, such as a vanity mirror, can be provided. In a most preferred embodiment, the visor is integrated into a two or three visor system which extends across the header rail and forms a unitary structure which provides a smooth clean appearance to the area above the windshield and functional sun-blocking protection with the roof in place or the roof removed.

These and other features, objects and advantages of the present invention will become apparent upon reading the following description thereof together with reference to the accompanying drawings.

DETAILED DESCRIPTION OF THE PREFERRED EMBODIMENT

Figure 1:
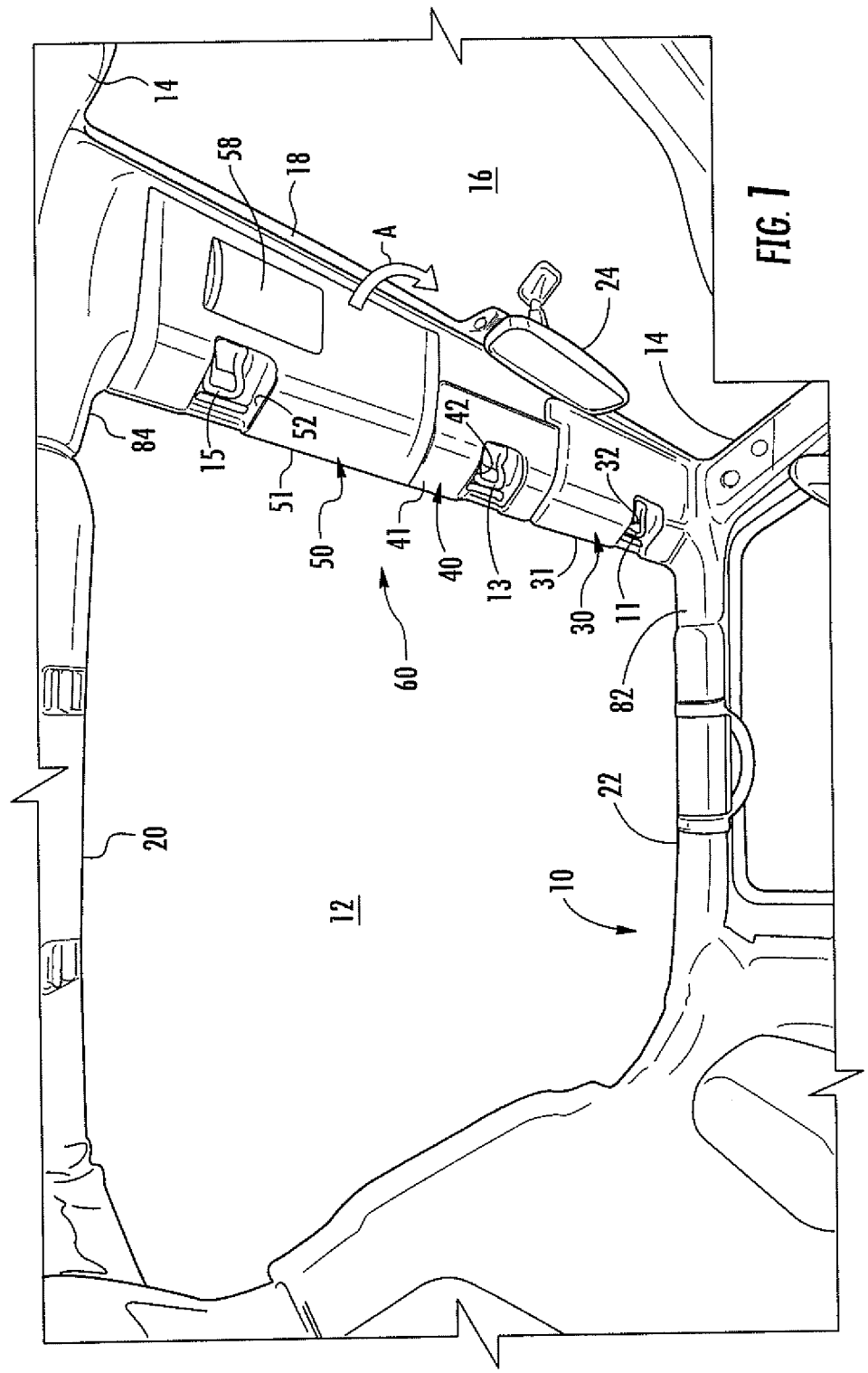
FIG. 1 is a perspective view of a vehicle embodying the visor system of the present invention, shown with the visors in a stowed position.
Figure 2:
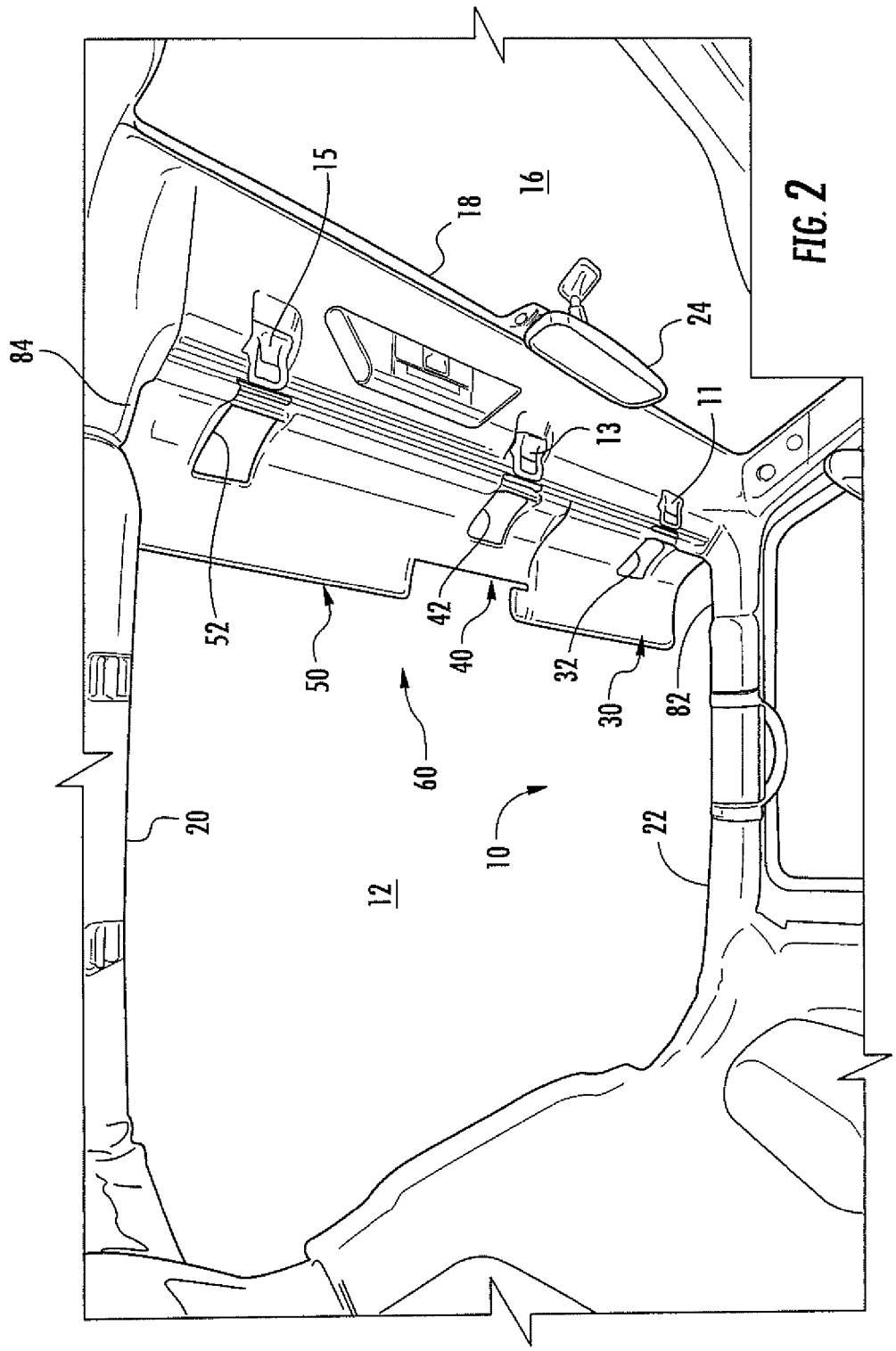
FIG. 2 is a perspective view of the vehicle shown in FIG. 1, shown with the visors in a fully rotated use position above the vehicle header rail.
Figure 3:
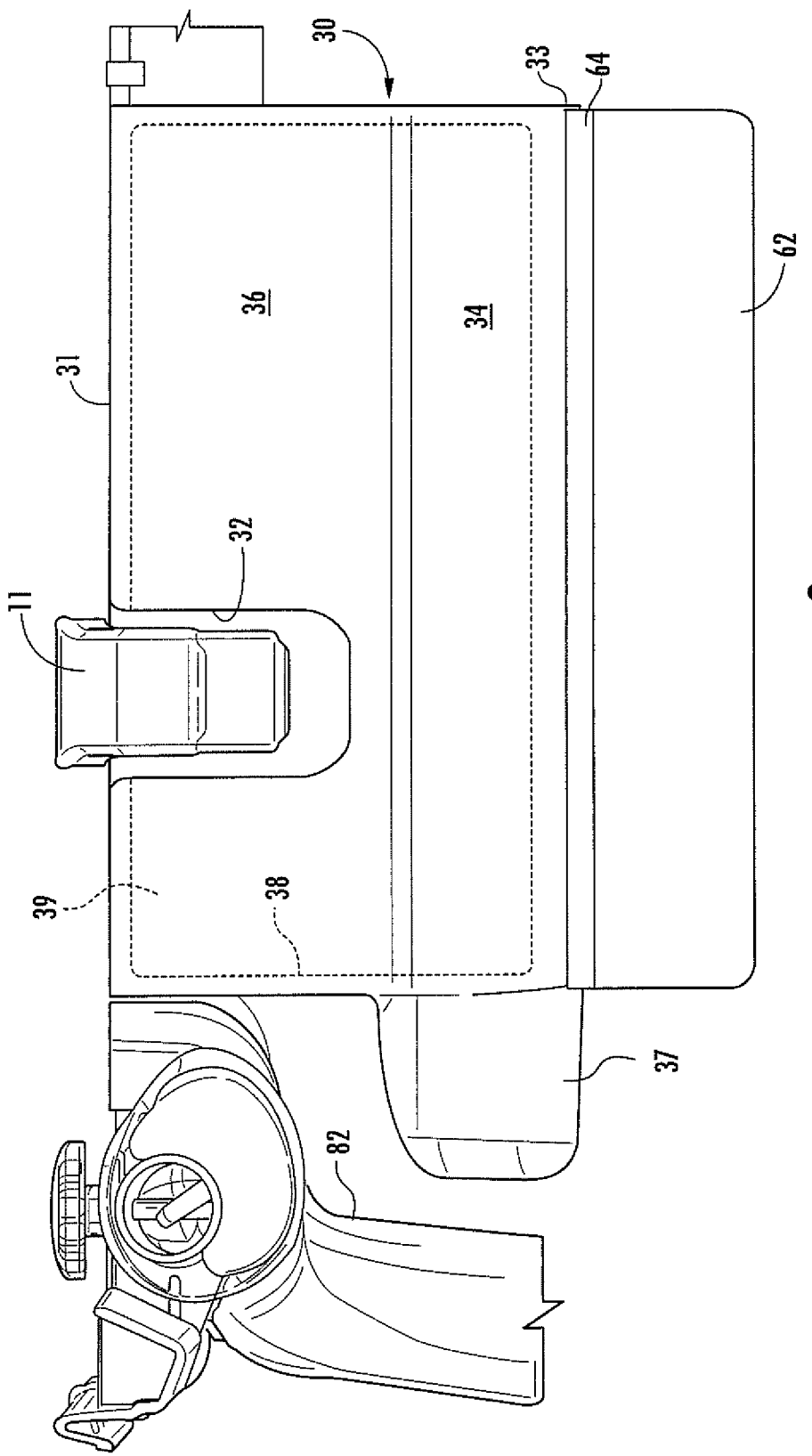
FIG. 3 is a front elevational view of the driver's side visor, shown in a lowered use position and with an extended glare shield.

Referring initially to FIGS. 1-3, there is shown a vehicle 10 with an open roof 12 formed by the removal of a roof panel (not shown). The vehicle may be one of several models, including, as an example only, a Jeep® Wrangler® JK made by Chrysler Corporation. The vehicle includes a pair of A-pillars 14 on either side of the windshield 16, a windshield header rail 18 extending between the A-pillars, and side support bars 20, 22 extending rearwardly and joined to a rear cross support structure (not shown). The vehicle includes a rearview mirror assembly 24 mounted to the windshield in the typical center area, as seen in FIGS. 1 and 2.

Figure 4:
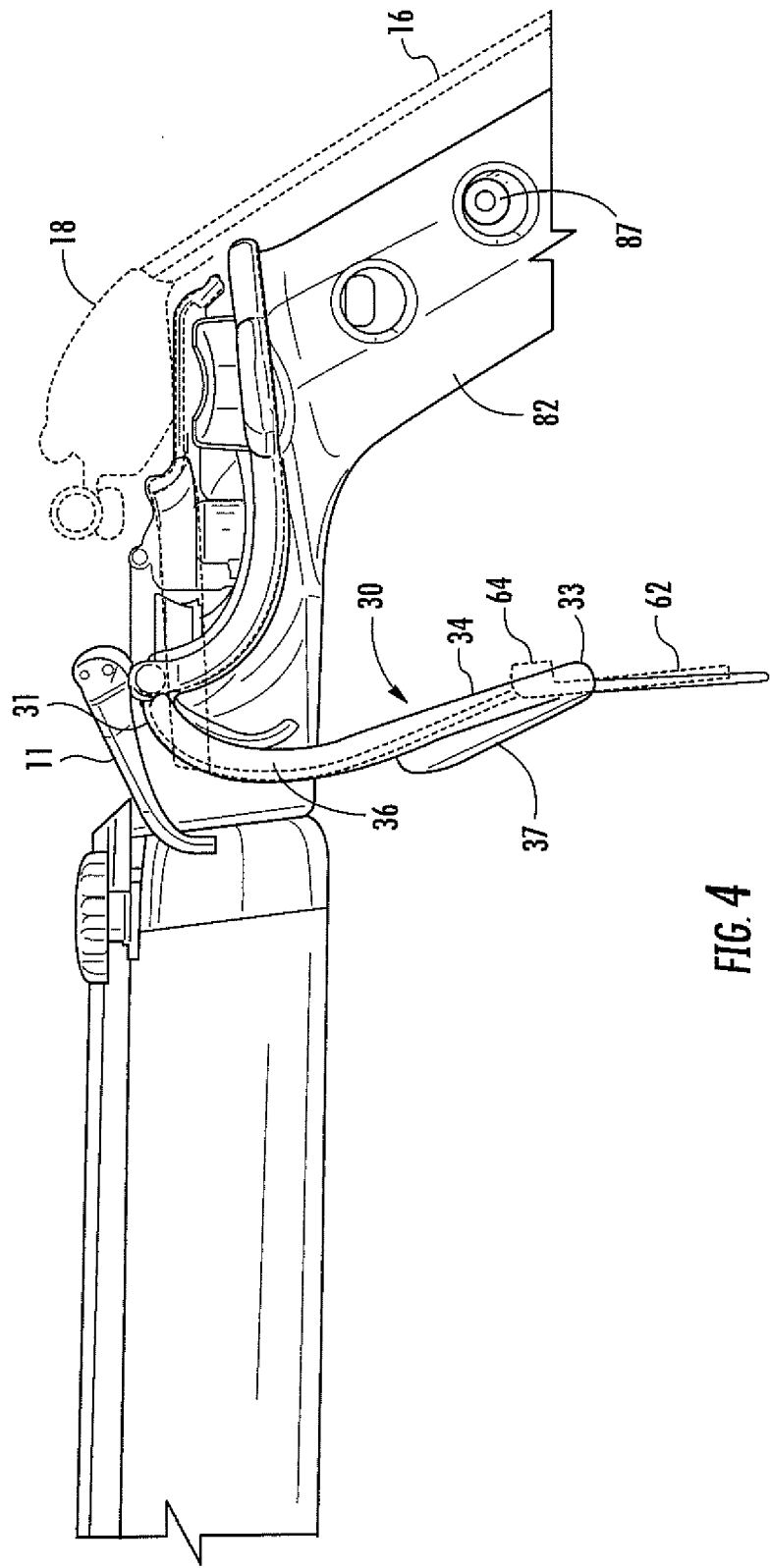
FIG. 4 is a fragmentary cross-sectional view of the visor shown in FIG. 3.

The improved visor of the present invention may include a single visor, a pair of visors, or a three visors in an overall system, as shown in FIGS. 1 and 2. The visor system 60, shown in FIGS. 1 and 2, includes three visors 30, 40, and 50, corresponding to the driver's side visor, a center visor, and a passenger's side visor. Each of the visors are hinged along their top edges 31, 41, and 51 to pivot downwardly and away from the windshield from the stowed position, shown in FIG. 1 in a direction indicated by arrow A in FIG. 1, to a typical use position as shown in FIGS. 3 and 4. They are pivotally mounted on pivot rods, as described below, such that they can be extended further, as shown in FIG. 2, to extend above the header rail 18 and the roof line of the vehicle to provide sun-blocking protection when the sun is at a higher elevation above the header rail 18 of the vehicle.

The particular vehicle shown includes latches 11, 13, and 15 for latching the roof panel (not shown) in a secure position to the header rail 18. To accommodate access to the latches, each of the visors 30, 40, and 50 include a rectangular aperture 32, 42, and 52, respectively, providing access for the roof latching mechanism to engage the latches 11, 13, and 15, respectively. The apertures 32, 42, and 52 may be enclosed by a snap-in cover 28 (FIG. 6) if desired when the roof is not installed to provide a more finished appearance to the installation.

Figure 5:
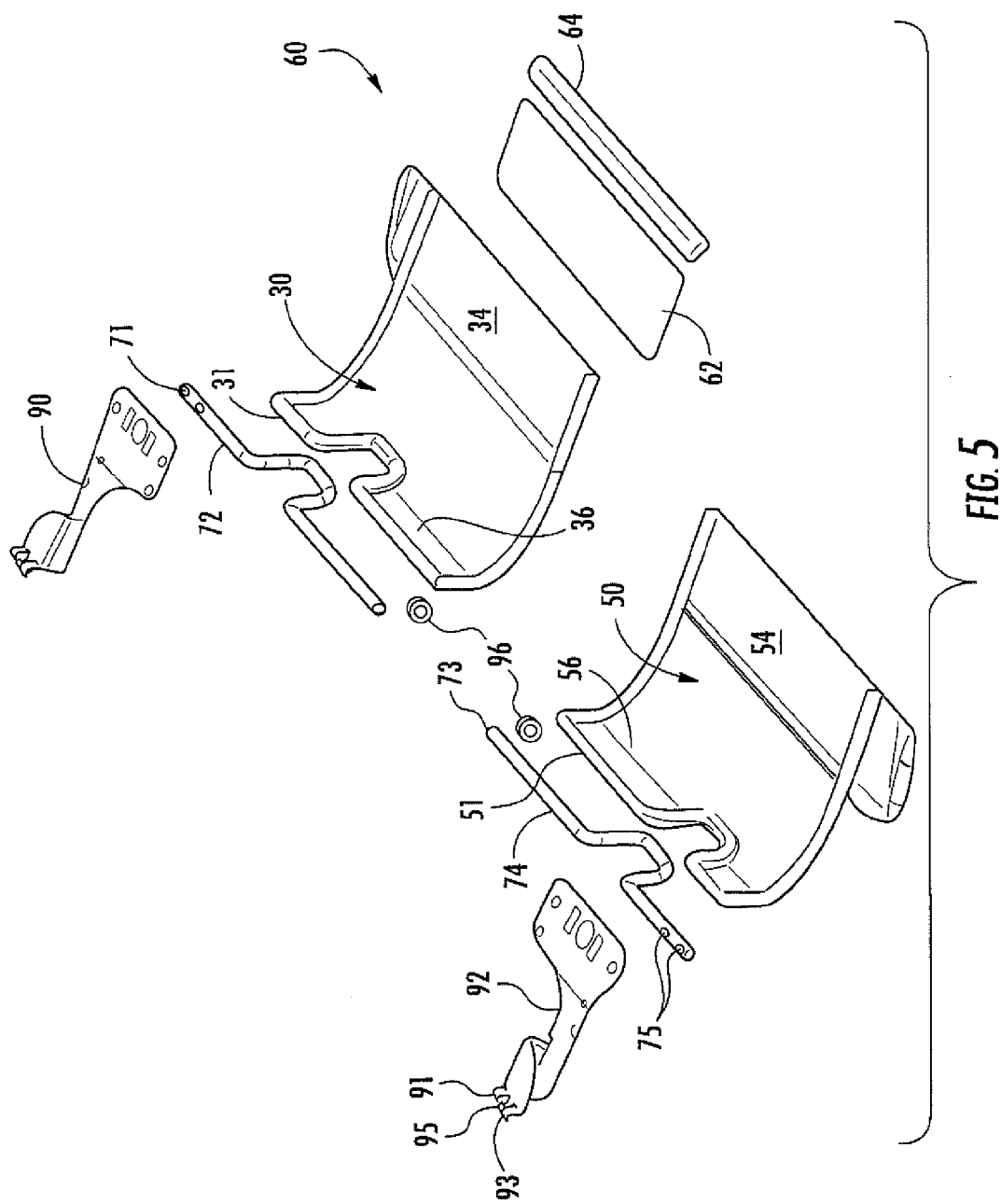
FIG. 5 is an exploded perspective view of a visor system with driver and passenger visors.
Figure 6:
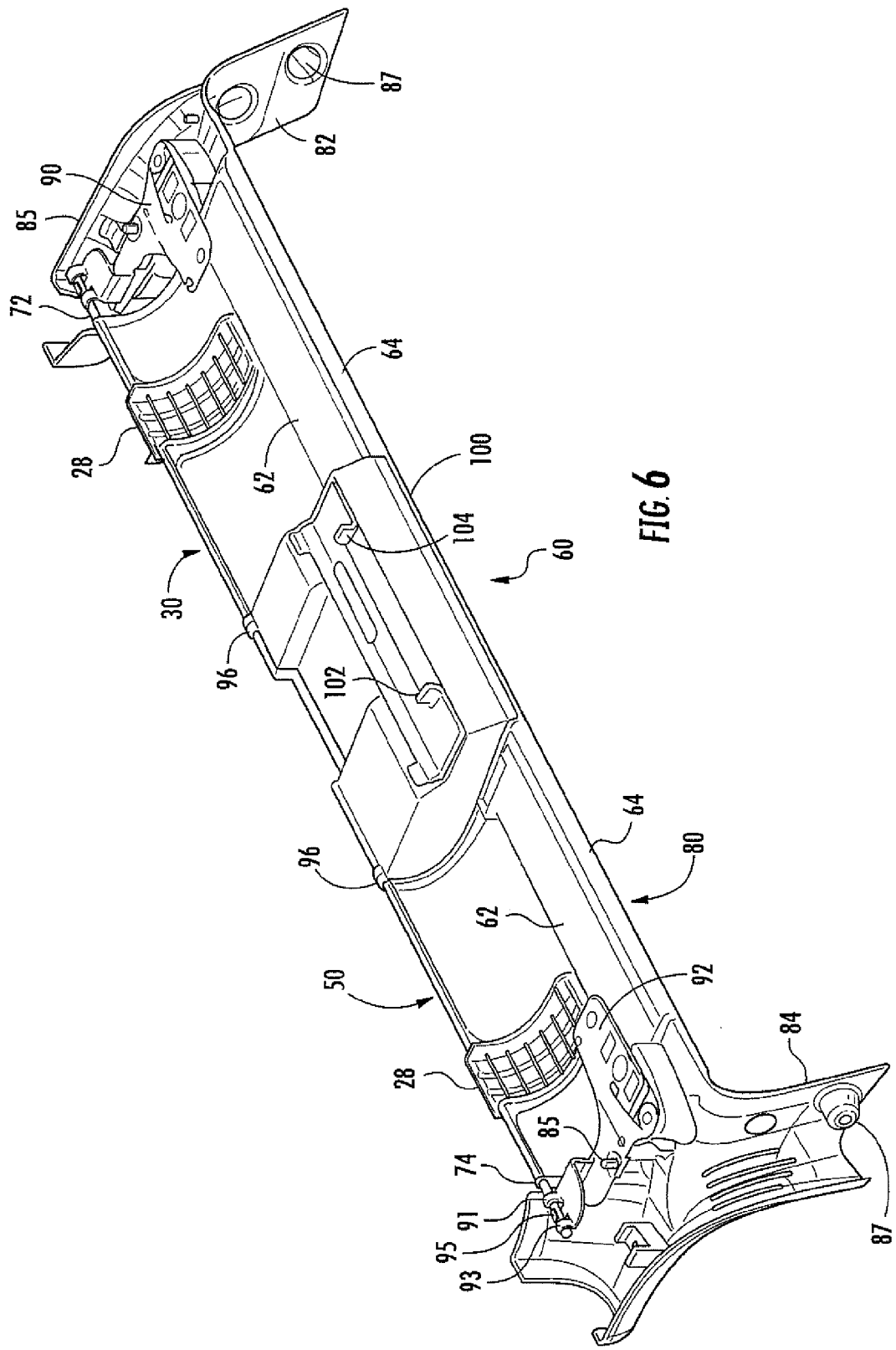
FIG. 6 is a cutaway top perspective view from a direction above and forward of the vehicle windshield, showing the components of the integrated visor system.

Each of the visors 30, 40, and 50 are integrally molded panels having a substantially flat lower section 34, 44, and 54 and a curved upper section 36, 46, and 56, as seen in the figures. The curved visor bodies are shaped to conform to the header rail to provide a smooth continuous line across the top of the windshield, as seen in FIG. 1. The upper edges 31, 41, and 51 of each of the visors includes an insert-molded pivot rod, such as rods 72 and 74, shown in the exploded view of FIG. 5 and in the assembled view of FIG. 6. The visor panels 30, 40, and 50 are molded of a suitable polymeric material, such as PVC, polycarbonate, ABS, or other polymeric material which is suitable for use in automotive applications. The visor rods 72 and 74 and a corresponding rod for the center visor 40 (not shown) are fixed with respect to the visor panels and rotate with respect to the header assembly 80, as shown in FIG. 6. The visors may be constructed to include a fabric or polymeric film body by molding or fabricating a frame from wire or the polymeric material and covering the frame with an opaque fabric or film. Such alternate construction is illustrated in FIG. 3 in phantom lines, showing frame 38 covered by fabric 39. The visor 30, as seen in FIG. 3, may optionally include a slide-out lateral extension 37 from one side to fill any gap of the visor coverage between the vehicle's A-pillar 14 and header rail 18.

The header assembly 80 includes a left mounting bracket 82 by the driver's side, a right mounting bracket 84 by the passenger's side, and a center console 100 extending between the two visors 30 and 50. The brackets 82 and 84 are secured to the A-pillars in the corners, as illustrated in FIGS. 1-3, and support torque clips 90 and 92, which include bifurcated fingers 91, 93, and 95, which engage flats 75 (FIG. 5) on opposite sides of the pivot rods 72, 74, when installed as shown in FIG. 6. Fingers 91 and 93 on the torque clips 90 and 92 are on one side of pivot rods 72 and 74, while the center finger 95 is on the opposite side, thereby compressively gripping the pivot rods 72 and 74 with a force sufficient to hold the relatively lightweight molded visor panels 30 and 50 in a desired fixed position. The center console 100 includes mounting clips 102, 104 for securing a center section of the assembly 80 to the header rail 18 in suitable sockets formed therein. Likewise mounting brackets 82 and 84 include mounting clips 85 for attachment to the header rail, as well as clips 87 for receiving fasteners (not shown) for securing the brackets to the A-pillars of the vehicle. The inward ends 71 and 73 of the pivot rods 72 and 74, respectively, are engaged by torque nuts 96, which are mounted to console 100 within the header assembly 80, for supporting the ends of the integrated pivot rods of both of the visors. The flats on pivot rods 72, 74 are positioned to hold the visor in a stowed position as seen in FIG. 1, a desired lower position as shown in FIGS. 3-4, or in the raised position as shown in FIG. 2.

Either or both of the visors 30 and 50 of the visor system 60 may include an auxiliary glare shield 62, which is pivotally mounted to the lower end 33 or 53 of the respective visor by pivot connection 64. Pivot connection 64 can be conventional and is shown schematically in the figures. The pivot connection can be alternately staggered cylindrical extrusions on the visor panels 30 and auxiliary glare shield 62, which inter-fit and receive a pivot pin, permitting sufficient frictional engagement to allow the glare shield to remain in a selected adjusted position. Alternatively, the glare shield 62 may be of the construction and mounted to visors 30 and 50 in a manner such as taught in U.S. patent application Ser. No. 13/530,226 filed on Jun. 22, 2012, entitled ROTATABLE GLARE SHIELD FOR A VISOR, the disclosure of which is incorporated herein by reference. The glare shield 62 may be made of any suitable material including opaque, transparent, tinted, translucent, polarized, or phototropic panels, as desired, for additional sun-screening protection, as illustrated in FIGS. 3-5. Each of the visors 30 and 50 may include auxiliary content, such as a vanity mirror covered with a sliding cover, such as cover 58 illustrated in FIG. 1, or other visor content where room permits.

Thus, with the visor system of the present invention, a relatively inexpensive, lightweight and durable visor or visors are provided for an open-roof vehicle and one which uniquely pivots from a front windshield position rearwardly for use with or without the roof in place on the vehicle. When the roof is removed, the visor can pivot beyond the horizontal position to block incoming sunlight above the roof line of the vehicle.

It will become apparent to those skilled in the art that various modifications to the preferred embodiment of the invention as described herein can be made without departing from the spirit or scope of the invention as defined by the appended claims.

The invention claimed is:

1. A visor for an open-roofed vehicle having a windshield and a header rail along the top of the windshield, said visor comprising:
a curved visor body having concave surface facing the vehicle windshield, said curved body conforming to a front header rail of a vehicle, such that when said visor is in a raised stored position, it partially surrounds said header rail; and
a pivot mount for mounting said visor body to a vehicle for movement in a direction away from a vehicle windshield from a stored position to a lowered sun-blocking position, such that said concave surface faces forwardly in the vehicle.

2. The visor as defined in claim 1 wherein said visor body includes a curved upper section and a substantially straight lower section.

3. The visor as defined in claim 2 and further including a lateral extension from one side of said lower section.

4. The visor as defined in claim 1 and further including an auxiliary glare shield pivotally mounted to said visor body on a side of said visor body, such that it can be rotated from a stored position adjacent and substantially coplanar with a lower section of said visor body to a use position extending away from said visor body for providing supplemental sun screening.

5. The visor as defined in claim 4 wherein said auxiliary glare shield is mounted to said visor body facing the vehicle windshield.

6. The visor as defined in claim 5 wherein said visor body includes a curved upper section and a substantially straight lower section and said glare shield is coplanar with said lower section when not in use.

7. The visor as defined in claim 6 wherein said visor body is molded of a polymeric material.

8. The visor as defined in claim 7 wherein said pivot mount includes a pivot rod insert-molded in said visor body with ends extending outwardly from said visor body.

9. The visor as defined in claim 8 and further including a torque clip mounted to a vehicle bracket and engaging at least one end of said pivot rod to hold said visor body in a position selected by the operator when rotated from a stored position.

10. The visor as defined in claim 9 wherein said auxiliary glare shield comprises a panel chosen from the group consisting of an opaque, micro-louver, transparent, tinted, translucent, polarized, and phototropic material.

11. The vehicle visor as defined in claim 1 wherein said visor body is a generally rectangular frame which is curved in a direction orthogonal to the rectangular shape for conforming to a front header rail of a vehicle, said frame made of one of a polymeric material or wire; and a cover surrounding and attached to said frame, said cover made of a flexible material selected from the group consisting of a fabric and a polymeric film.

12. The visor as defined in claim 11 wherein said frame is made of a polymeric material and integrally includes an insert molded pivot rod with ends that extend from opposite ends of said frame.

13. A vehicle visor comprising:
a curved visor body for conforming to a front header rail of a vehicle, wherein said visor body is a generally rectangular frame which is curved in a direction orthogonal to the rectangular shape for conforming to a front header rail of a vehicle, said frame made of a polymeric material and integrally includes an insert molded pivot rod of with ends that extend from opposite ends of said frame, and a cover surrounding and attached to said frame, said cover made of a flexible material; and a pivot mount for mounting said visor body to a vehicle for movement in a direction away from a vehicle windshield from a stored position to a lowered use position, and further including a torque clip mounted to a vehicle bracket and engaging at least one end of said pivot rod to hold said frame in a position selected by the operator when rotated from a stored position.

14. The visor as defined in claim 13 wherein said flexible material is selected from the group consisting of a fabric and a polymeric film.

15. The visor as defined in claim 13 wherein said frame includes a curved upper section and a substantially straight, lower section.

16. The visor as defined claim 15 and further including a lateral extension from one side of said lower section.

17. The visor as defined in claim 13 and further including an auxiliary glare shield pivotally mounted to said visor body on a side of said visor body, such that it can be rotated from a stored position adjacent and substantially coplanar with a lower section of said visor body to a use position extending away from said visor body for providing supplemental sun screening.

18. The visor as defined in claim 17 wherein said auxiliary glare shield is mounted to said visor body facing the vehicle windshield.

19. The visor as defined in claim 18 wherein said visor body includes a curved upper section and a substantially straight lower section and said glare shield is coplanar with said lower section when in a stored position.

\* \* \* \* \*

UNITED STATES PATENT AND TRADEMARK OFFICE
CERTIFICATE OF CORRECTION

Page 1 of 1

PATENT NO.        : 8,657,357 B2
APPLICATION NO.   : 13/535519
DATED             : February 25, 2014
INVENTOR(S)       : Dexter et al.

It is certified that error appears in the above-identified patent and that said Letters Patent is hereby corrected as shown below:

In the Claims

Column 4, line 8, after "having" insert --a--;

Column 5, line 16, delete "," after --straight--; and

Column 6, line 1, after "defined" insert --in--.

Signed and Sealed this
Seventh Day of October, 2014

Michelle K. Lee
*Deputy Director of the United States Patent and Trademark Office*